Dec. 13, 1932.  E. KEHR  1,890,686
AUTO MECHANIC'S ACCESSORY
Filed April 13, 1932
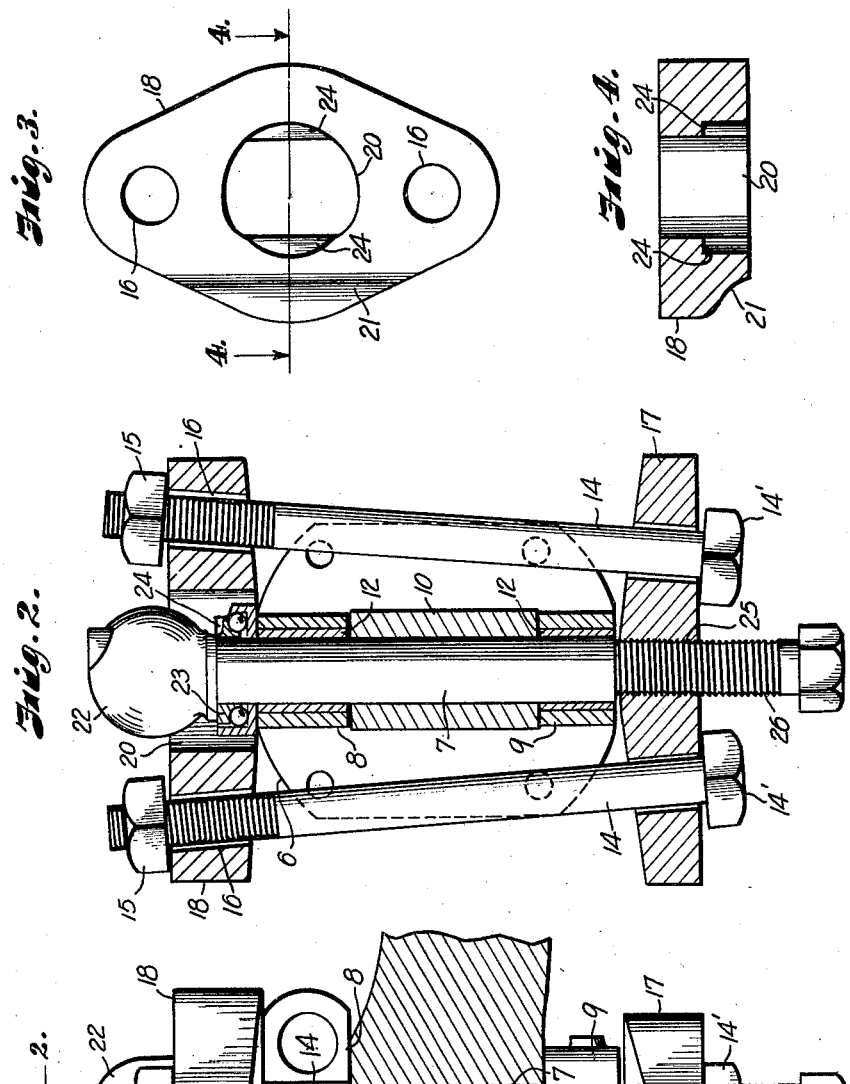

Patented Dec. 13, 1932

1,890,686

UNITED STATES PATENT OFFICE

ERNEST KEHR, OF DIXON, MISSOURI

AUTO MECHANIC'S ACCESSORY

Application filed April 13, 1932. Serial No. 604,952.

The present invention relates to automobile tools or appliances, and is of a type especially adapted for effecting the removal of bolts or spindles from the bearing or supporting structure from which such bolts or spindles are required to be temporarily withdrawn for repair or replacement or other purposes. Frequently these bolts or spindles are found to have become stuck or "frozen" in place and therefore difficult to remove from the supporting structure, so that extra effort or force is required to extract them in such repair or replacement operations.

Accordingly I have devised an appliance which is not only easily and conveniently operated, but also extremely effective for the removal of spindles or bolts of this character in a speedy manner and with comparatively small effort or labor on the part of the workman.

The improved appliance comprises few elements of a simple type which may be easily and quickly assembled in place, and thereafter operated by impact thrusts applied in alinement with the bolt or spindle to one end thereof, the extracting operation taking place without damage or injury of any sort to any of the parts of the construction.

It is also an object of my invention to provide an improved construction of an inexpensive, economical and durable character, and with practically nothing to wear or get out of order.

With the foregoing general objects in view, the invention will now be described by reference to the accompanying drawing, illustrating one form of construction which I have found suitable and practicable for the purpose in view, after which those features and combinations deemed to be novel will be set forth and particularly claimed.

In the drawing—

Figure 1 is a side elevation illustrating an appliance embodying the present improvements, and applied in operative relation to a spindle bolt and its bearing structure;

Figure 2 is a vertical sectional view, representing a section taken on the line 2—2 of Figure 1;

Figure 3 is an inverted plan view of the upper supporting member of the device;

Figure 4 is a transverse section taken on the line 4—4 of Figure 3.

Referring now to the drawing in detail, this illustrates the usual type of spindle member comprising the arm 5, plate portion 6 and spindle bolt 7 passing through lugs 8, 9, and the adjacent axle end 10 to which the bolt 7 is keyed by a locking pin (not shown) engaged with registering recesses 11 (Figure 1). The bearings provided by said lugs 8, 9, are ordinarily equipped with bushings 12, as shown in Figure 2. Regardless of the careful and accurate machining of these parts, however, it is often extremely difficult for a mechanic to extract the bolt 7 for repair purposes, because of its becoming stuck or "frozen" in its bearing within the opening in the end of the axle 10. For accomplishing this operation easily and conveniently I provide the accessory or tool appliance illustrated herein.

This appliance comprises a pair of bolts 14 of ample strength, with angular heads 14' and provided with nuts 15 for bolt securing and adjusting purposes. The opposite ends of the bolts are received within openings 16 provided in a pair of metal plates or block members, namely, a lower screw-carrying block 17 and an upper anchoring or bolt suspension block 18 which is provided with an opening 20 for accommodating the upper end 22 of the bolt 7 and its thrust bearing member 23, as clearly shown in Figure 2. The opening 20 is of a size which allows the upper block 18 to be supported upon the upper lug 8, so that the lower block 17 is adapted to be suspended in position directly beneath the under side of the lower lug 9, one side of the block 18 being partly cut away as indicated at 21 to clear the adjacent edge of the plate 6. The opening 20 is also formed with internal shoulders 24 for engagement with the top of the bearing member 23, for the purpose of extracting the bolt 7 from said bearing as well as from the bearing lugs 8 and 9.

The middle portion of the lower block 17 is formed with a threaded opening 25 for the mounting of the thrust or impact screw 26 in such a position as to be readily alined with the lower end of the spindle bolt 7, as clearly represented in Figure 2.

The method of using the appliance is illustrated in Figures 1 and 2, which show the same in operative position. For mounting it in this position, the upper part comprising the block 18 is first applied to the upper end of the spindle, so that the opening 20 is brought into the position shown in Figure 2, that is, surrounding the bearing 23 and the head 22 of the spindle bolt, and the block 18 resting upon the upper lug 8, with the shoulders 24 engaging the top of the bearing 23 at opposite sides thereof.

The screw 26 and nuts 15 are then unscrewed sufficiently to lower the block 17 enough to clear and swing beneath the lower lug 9 and bring the screw 26 into alinement with the lower end of the bolt 7, after which the nuts are tightened sufficiently to raise the block 17 into slightly spaced relation to the under side of said lug 9 and the screw 26 also screwed up into engagement with the bolt 7 as shown. The operator then delivers several sharp blows with a hammer on the lower end of the screw 26, which will have the result of loosening the bolt sufficiently to permit of its being readily and easily removed. In case of the bolt still sticking after being only partly withdrawn, the screw may be advanced from time to time to maintain engagement with the lower end of the bolt, and the hammering operation repeated until the bolt is effectively and completely loosened and entirely withdrawn from both the axle and bearing structure.

It is thus apparent that I have devised a simple and efficient working appliance for the purpose in view, which comprises in effect a hanger structure for application to the spindle bearing structure in such a way as to serve as a support for a thrust or impact screw whereby the latter may be operatively positioned in proper alinement with the spindle bolt and in such impact relation as will facilitate the use of the hammer for effectively loosening the bolt under the blows of the hammer as transmitted through the medium of said thrust screw.

While I have shown and described what is now regarded as a practical and efficient form of embodiment of my improvement, I desire to be understood as reserving the right to make whatever minor changes or modifications may be found desirable, so long as these fall within the spirit and scope of the appended claims.

Having thus described my invention, what I claim to be new and desire to secure by Letters Patent is:

1. An appliance for loosening and removing spindle bolts from their bearing structure, comprising a pair of blocks for embracing opposite sides of said bearing structure, bolts connecting said blocks at opposite sides of the spindle bolt, said blocks having bolt openings slightly larger than the bolt diameters, for permitting not only free longitudinal but also slight lateral or angular play of said bolts within said openings one of the blocks being formed with an opening for clearance of the head of the spindle bolt, and the other block carrying an impact screw element in impact alinement with one end of said spindle bolt.

2. An appliance for loosening and removing spindle bolts from their thrust bearings and their supporting structures, comprising a block for engagement with the spindle supporting structure and formed with an opening for clearance of the head of the spindle bolt, said opening being recessed to provide shoulders for engagement with the thrust bearing on the spindle, and an impact element suspended from said block in alinement with the lower end of the spindle bolt.

In witness whereof I hereunto affix my signature.

ERNEST KEHR.